US012621915B2

(12) United States Patent
Guo

(10) Patent No.: US 12,621,915 B2
(45) Date of Patent: May 5, 2026

(54) METHOD FOR CONTROLLING LAMP STRIP, LAMP STRIP SYSTEM, ELECTRONIC DEVICE AND STORAGE MEDIUM

(71) Applicant: SHENZHEN SKYWORTH-RGB ELECTRONIC CO., LTD., Shenzhen (CN)

(72) Inventor: Minghai Guo, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 51 days.

(21) Appl. No.: 18/744,500

(22) Filed: Jun. 14, 2024

(65) Prior Publication Data

US 2024/0341023 A1 Oct. 10, 2024

Related U.S. Application Data

(63) Continuation of application No. PCT/CN2022/102938, filed on Jun. 30, 2022.

(30) Foreign Application Priority Data

Dec. 17, 2021 (CN) ......................... 202123203865.2
Dec. 31, 2021 (CN) ......................... 202111681425.X

(51) Int. Cl.
*H05B 47/155* (2020.01)
*F21S 4/20* (2016.01)
(Continued)

(52) U.S. Cl.
CPC .............. *H05B 47/155* (2020.01); *F21S 4/20* (2016.01); *H05B 45/20* (2020.01); *H05B 47/12* (2020.01);
(Continued)

(58) Field of Classification Search
CPC ........... F21S 4/20; H05B 45/20; H05B 47/10; H05B 47/105; H05B 47/12; H05B 47/155;
(Continued)

(56) References Cited

U.S. PATENT DOCUMENTS 10,728,979 B1 * 7/2020 Suttles .................. H05B 47/18
12,267,933 B1 * 4/2025 Zhu ..................... H05B 47/165
(Continued)

FOREIGN PATENT DOCUMENTS

CN 104093240 A 10/2014
CN 109654398 A 4/2019
(Continued)

OTHER PUBLICATIONS

Machine Translation CN112423438A (Year: 2021).*
(Continued)

*Primary Examiner* — Raymond R Chai
(74) *Attorney, Agent, or Firm* — Westbridge IP LLC

(57) ABSTRACT

Disclosed are a method for controlling a lamp strip, a lamp strip system, an electronic device and a storage medium. The electronic device is connected to the lamp strip. The lamp strip includes a plurality of sub-lamp strips, and each sub-lamp strip corresponds to a plurality of lamp beads. The method includes: obtaining target program information played by the electronic device and a target light control strategy corresponding to the target program information; determining light drive data corresponding to a plurality of the lamp beads according to the target program information, the target light control strategy, a shape of the lamp strip and the lamp beads corresponding to each of the sub-lamp strips; and sending a plurality of the light drive data to the lamp strip, so that the lamp strip performs display control on a plurality of the lamp beads according to the plurality of the light drive data.

9 Claims, 6 Drawing Sheets

(51) Int. Cl.

| | |
|---|---|
| ***H05B 45/20*** | (2020.01) |
| ***H05B 47/12*** | (2020.01) |
| ***H05B 47/175*** | (2020.01) |
| ***H05B 47/19*** | (2020.01) |

(52) U.S. Cl.
CPC .......... *H05B 47/19* (2020.01); *H05B 47/197* (2024.01); *H05B 47/1985* (2024.01)

(58) Field of Classification Search
CPC ... H05B 47/19; H05B 47/197; H05B 47/1985
See application file for complete search history.

(56) References Cited

U.S. PATENT DOCUMENTS

| | | | | |
|---|---|---|---|---|
| 2018/0172226 | A1 | 6/2018 | Zhao | |
| 2018/0368230 | A1* | 12/2018 | Chen | H05B 45/20 |
| 2019/0199958 | A1 | 6/2019 | Abe et al. | |
| 2021/0182445 | A1* | 6/2021 | Franciosa | G06F 30/13 |

FOREIGN PATENT DOCUMENTS

| | | | | |
|---|---|---|---|---|
| CN | 110843665 | A | 2/2020 | |
| CN | 111479371 | A | 7/2020 | |
| CN | 111787658 | A | 10/2020 | |
| CN | 112417659 | A | 2/2021 | |
| CN | 112423438 | A * | 2/2021 | H05B 47/165 |
| CN | 113573113 | A | 10/2021 | |
| CN | 113613370 | A | 11/2021 | |
| CN | 113677077 | A | 11/2021 | |
| CN | 114340102 | A | 4/2022 | |
| CN | 216721637 | U | 6/2022 | |
| WO | 2020089144 | A1 | 5/2020 | |

OTHER PUBLICATIONS

First Office Action issued in counterpart Chinese Patent Application No. 202111681425.X, dated May 26, 2023.
International Search Report and Written Opinion issued in corresponding PCT Application No. PCT/CN2022/102938, dated Aug. 25, 2022.
Notification to Grant Patent Right for Invention issued in counterpart Chinese Patent Application No. 202111681425.X, dated Mar. 13, 2024.
Second Office Action issued in counterpart Chinese Patent Application No. 202111681425.X, dated Nov. 30, 2023.
European Search Report issued in counterpart European Patent Application No. EP 22905856.5, dated Nov. 5, 2025.

* cited by examiner

METHOD FOR CONTROLLING LAMP STRIP, LAMP STRIP SYSTEM, ELECTRONIC DEVICE AND STORAGE MEDIUM

CROSS-REFERENCE TO RELATED APPLICATIONS

The present application is a continuation application of International Application No. PCT/CN2022/102938, filed on Jun. 30, 2022, which claims priority to Chinese Patent Application No. 202123203865.2, filed on Dec. 17, 2021, and Chinese Patent Application No. 202111681425.X, filed on Dec. 31, 2021. The disclosures of the above-mentioned applications are incorporated herein by reference in their entireties.

TECHNICAL FIELD

The present application relates to the technical field of light control, and in particular to a method for controlling a lamp strip, a lamp strip system, an electronic device and a storage medium.

BACKGROUND

Electronic devices have penetrated into thousands of households and played an important role in enriching people's amateur cultural life and spreading culture, knowledge and news. As people have higher and higher requirements for the listening experience of electronic device, it is necessary to install ambient lights for electronic device (also called lamp strips) became a viable method.

Currently, in the existing technology, the electronic device is connected to a lamp strip and provides power to the lamp strip, and the lamp strip controls the display of the lamp strip according to a preset display strategy.

However, the display control of the lamp strip is independent of the electronic device, resulting in a lack of interaction between the electronic device and the lamp strip, and the lamp strip has a poor effect in improving the user's listening experience. Therefore, how to improve the connection and interaction between lamp strips and electronic devices and improve the user's listening experience is an urgent technical problem that needs to be solved.

SUMMARY

The main purpose of the present application is to provide a method for controlling a lamp strip, apparatus, electronic device, system and storage medium, aiming to solve the technical problem in the existing technology of how to improve the connection and interaction between the lamp strip and the electronic device.

In order to achieve the above purpose, the present application provides a method for controlling the lamp strip, applied to the electronic device. The electronic device is connected to the lamp strip, the lamp strip includes a plurality of sub-lamp strips, and each of the sub-lamp strips corresponds to a plurality of lamp beads. The method includes:

- obtaining target program information played by the electronic device and a target light control strategy corresponding to the target program information;
- determining light drive data corresponding to a plurality of the lamp beads according to the target program information, the target light control strategy, a shape of the lamp strip and the lamp beads corresponding to each of the sub-lamp strips; and
- sending a plurality of the light drive data to the lamp strip, so that the lamp strip performs display control on a plurality of the lamp beads according to the plurality of the light drive data.

In addition, in order to achieve the above purpose, the present application also provides a lamp strip system, including:

- an electronic device, including a data interaction module; and
- a lamp strip, including a lamp strip controller and a plurality of lamp beads.

The data interaction module is configured to send lamp strip control information to the lamp strip controller.

The lamp strip controller is connected to the data interaction module and is configured to receive the lamp strip control information, convert the lamp strip control information into a first lamp strip control instruction, and send the first lamp strip control instruction to the lamp bead.

The lamp bead is connected to the lamp strip controller, and is configured to receive the first lamp strip control instruction, and perform a corresponding display action according to received first lamp strip control instruction.

In addition, in order to achieve the above purpose, the present application also provides an electronic device, including:

- a memory;
- a processor; and
- a program for controlling the lamp strip stored in the memory and run on the processor.

When the program for controlling the lamp strip is controlled by the processor, the method for controlling the lamp strip as described above is implemented.

In addition, in order to achieve the above purpose, the present application also provides a non-transitory computer-readable storage medium on which a program for controlling the lamp strip is stored, and when the program for controlling the lamp strip is executed by a processor, the method for controlling the lamp strip as described above is implemented.

The present application provides a method for controlling the lamp strip, applied to the electronic device. The electronic device is connected to the lamp strip, the lamp strip includes a plurality of sub-lamp strips, and each of the sub-lamp strips corresponds to a plurality of lamp beads. The method includes: obtaining target program information played by the electronic device and a target light control strategy corresponding to the target program information; determining light drive data corresponding to a plurality of the lamp beads according to the target program information, the target light control strategy, a shape of the lamp strip and the lamp beads corresponding to each of the sub-lamp strips; and sending a plurality of the light drive data to the lamp strip, so that the lamp strip performs display control on a plurality of the lamp beads according to the plurality of the light drive data.

Using the method of the present application, the electronic device automatically obtains the light drive data corresponding to a plurality of the lamp beads in the lamp strip according to the target program information, a shape of the lamp strip and the lamp beads corresponding to each of the sub-lamp strips, so that the light strip uses the light drive data to perform display control on several lamp beads, so as to realize interactive control between electronic device and the lamp strip.

BRIEF DESCRIPTION OF THE DRAWINGS

In order to more clearly explain technical solutions in the embodiments of the present application or in the related art, accompanying drawings needed to be used in the description of the embodiments or the related art will be briefly introduced below. Obviously, the drawings in the following description are only some embodiments of the present application. For those skilled in the art, other drawings can be obtained based on the structures shown in these drawings without creative efforts.

The realization of the purpose, functional features and advantages of the present application will be further described in conjunction with the embodiments, with reference to the accompanying drawings.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only some rather than all of the embodiments of the present application. Based on the embodiments in the present application, all other embodiments obtained by those skilled in the art without creative efforts fall within the scope of the present application.

Figure 1:
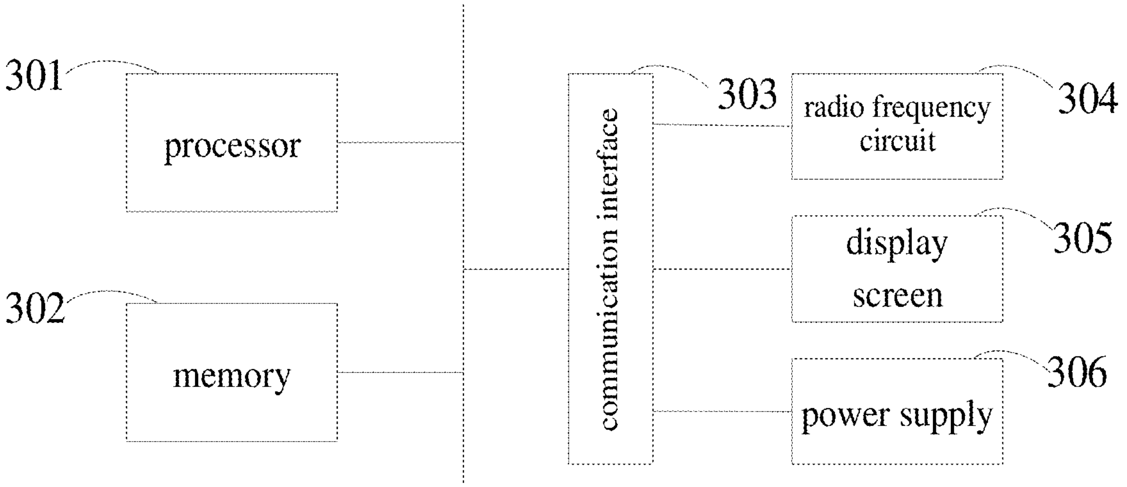
FIG. 1 is a schematic structural diagram of an electronic device of a hardware operating environment according to an embodiment of the present application.

Referring to FIG. 1, FIG. 1 is a schematic structural diagram of an electronic device of a hardware operating environment according to an embodiment of the present application.

Generally, the electronic device includes: at least one processor 301, a memory 302, and a program for controlling the lamp strip stored on the memory and executable on the processor. The program for controlling the lamp strip is configured to implement the method for controlling the lamp strip as described above.

The processor 301 can include one or more processing cores, such as a 4-core processor, an 8-core processor, etc. The processor 301 can be implemented in at least one hardware form of digital signal processing (DSP), field programmable gate array (FPGA) and programmable logic array (PLA). The processor 301 can also include a main processor and a co-processor. The main processor is a processor used to process data in a wake-up state, also called central processing unit (CPU). The co-processor is a low-power processor used to process data in a standby state. In some embodiments, the processor 301 can be integrated with a graphics processing unit (GPU, image processor), and the GPU is responsible for rendering and drawing content to be displayed on the display screen. The processor 301 can also include an artificial intelligence (AI) processor, which is used to process operations related to the method for controlling the lamp strip, so that the method for controlling the lamp strip model can autonomously train and learn, improving efficiency and accuracy.

The memory 302 can include one or more storage media, which can be non-transitory. The memory 302 can also include a high-speed random access memory and a non-volatile memory, such as one or more disk storage devices, flash memory storage devices. In some embodiments, the non-transitory storage medium in the memory 302 is used to store at least one instruction, and the at least one instruction is used to be executed by the processor 301 to implement the method for controlling the lamp strip provided by the method embodiment in the present application.

In some embodiments, the terminal optionally further includes: a communication interface 303 and at least one peripheral device. The processor 301, the memory 302 and the communication interface 303 can be connected through a bus or a signal line. Each peripheral device can be connected to the communication interface 303 through a bus, a signal line or a circuit board. Specifically, the peripheral device includes at least one of a radio frequency circuit 304, a display screen 305, and a power supply 306.

The communication interface 303 can be configured to connect at least one peripheral device related to input/output (I/O) to the processor 301 and the memory 302. In some embodiments, the processor 301, the memory 302 and the communication interface 303 are integrated on the same chip or circuit board. In some other embodiments, any one or two of the processor 301, the memory 302 and the communication interface 303 can be implemented on a separate chip or circuit board, which is not limited in this embodiment.

The radio frequency circuit 304 is configured to receive and transmit a radio frequency (RF) signal, also called an electromagnetic signal. The radio frequency circuit 304 communicates with communication networks and other communication devices through the electromagnetic signal. The radio frequency circuit 304 converts an electrical signal into the electromagnetic signal for transmission, or converts the received electromagnetic signal into the electrical signal. In an embodiment, the radio frequency circuit 304 includes an antenna system, an RF transceiver, one or more amplifiers, a tuner, an oscillator, a digital signal processor, a codec chipset, a user identity module card, and the like. The radio frequency circuit 304 can communicate with other terminals through at least one wireless communication protocol. The wireless communication protocol includes but is not limited to: metropolitan area network, various generations of mobile communication networks (2G, 3G, 4G and 5G), wireless local area network and/or wireless fidelity (WiFi) network. In some embodiments, the radio frequency circuit 304 can also include circuits related to near field communication (NFC), which is not limited in the present application.

The display screen 305 is configured to display a user interface (UI). The UI can include graphics, text, icons, videos, and any combination thereof. When the display screen 305 is a touch display screen, the display screen 305 also has the ability to collect touch signals on or above a surface of the display screen 305. The touch signal can be input to the processor 301 as a control signal for processing. At this time, the display screen 305 can also be configured to provide virtual buttons and/or virtual keyboards, also called soft buttons and/or soft keyboards. In some embodiments, one display screen 305 can be provided, located on the front panel of the electronic device. In other embodiments, at least two display screens 305 can be provided, and respectively provided on different surfaces of the electronic device or in a foldable design. In other embodiments, the display screen 305 can be a flexible display screen, and provided on a curved or folded surface of the electronic device. In addition, the display screen 305 can also be provided in a non-rectangular irregular shape, that is, a special-shaped screen. The display screen 305 can be made of materials such as liquid crystal display (LCD) and organic light-emitting diode (OLED).

The power supply 306 is configured to power various components in the electronic device. The power source 306 can be alternate current (AC), direct current (DC), disposable batteries, or rechargeable batteries. When the power source 306 includes a rechargeable battery, the rechargeable battery can support wired charging or wireless charging. The rechargeable battery can also be used to support fast charging technology.

Those skilled in the art can understand that the structure shown in FIG. 1 does not constitute a limitation of the electronic device, and can include more or fewer components than shown, or combinations of certain components, or differently arranged components.

In addition, embodiments of the present application also provide a storage medium on which a program for controlling the lamp strip is stored. When the program for controlling the lamp strip is executed by a processor, steps of the method for controlling the lamp strip described above are implemented. Therefore, no further details will be given here. In addition, the description of the beneficial effects of using the same method will not be described again. For technical details not disclosed in the storage medium embodiments involved in the present application, please refer to the description of the method embodiments in the present application. By way of example, the program instruction can be deployed to be executed on one electronic device, or on multiple electronic devices located at one location, or on multiple electronic devices distributed across multiple locations and interconnected by a communications network.

Those skilled in the art can understand that all or part of the processes in the methods of the above embodiments can be completed by instructing relevant hardware through computer programs. The above programs can be stored in a storage medium. When the program is executed, the processes of the embodiments of each of the above methods can be included. The above-mentioned storage medium can be a magnetic disk, an optical disk, a read-only memory (ROM) or a random access memory (RAM), etc.

Figure 2:
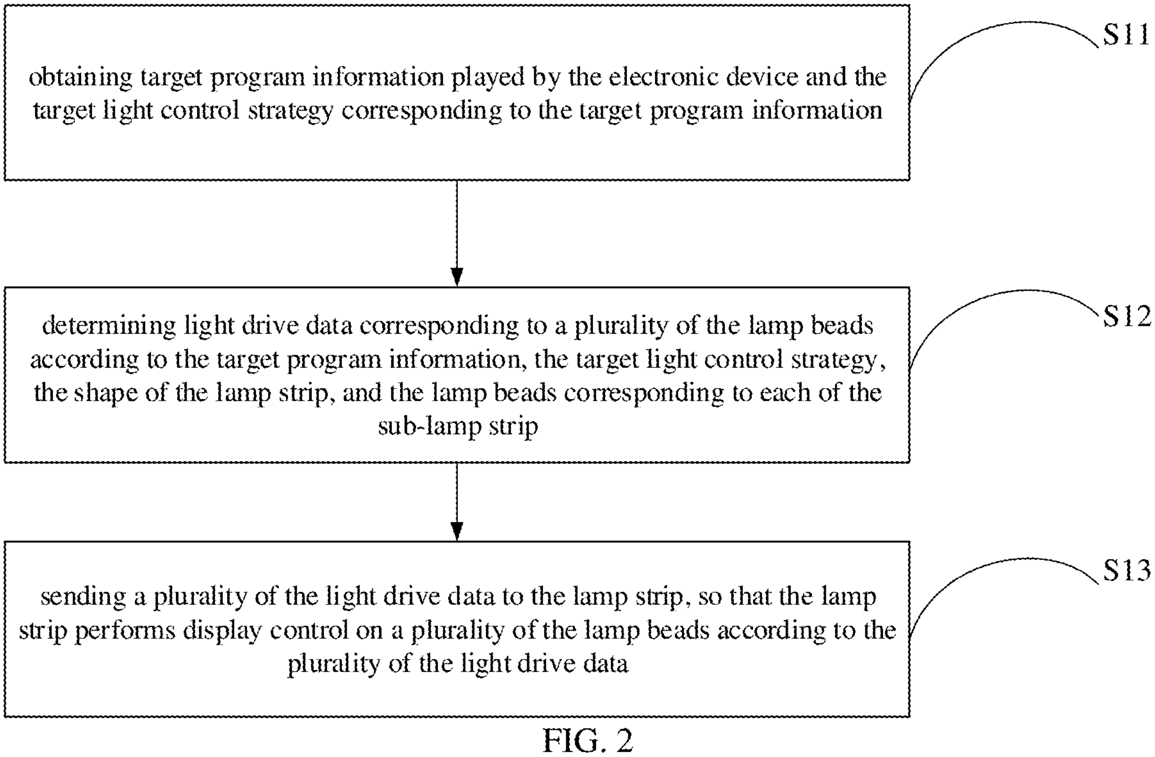
FIG. 2 is a schematic flow chart of a method for controlling a lamp strip according to the present application.

Referring to FIG. 2, FIG. 2 is a schematic flow chart of the method for controlling the lamp strip according to the present application. The method includes:

step S11, obtaining target program information played by the electronic device and a target light control strategy corresponding to the target program information.

It should be noted that the execution subject of the present application is an electronic device. The electronic device is equipped with a program for controlling the lamp strip. When the electronic device executes the program for controlling the lamp strip, steps of the method for controlling the lamp strip of the present application are implemented. The target program information usually refers to the program information being output by the electronic device, which can be image information (especially the video frame information in the video, the images in non-video are determined to be the application interface information later) or sound information, etc.

In the present application, the electronic device is connected to a lamp strip, and the lamp strip includes a plurality of lamp beads. The lamp strip can be any form of ambient light, which is not limited in the present application. Usually, one lamp bead corresponds to R unit (red unit), G unit (green unit) and B unit (blue unit), and by outputting different R values, G values and B values, the lamp bead shows different colors. The lamp strip includes several segments, each segment is a sub-lamp strip, and each sub-lamp strip corresponds to a plurality of lamp beads.

Figure 3:
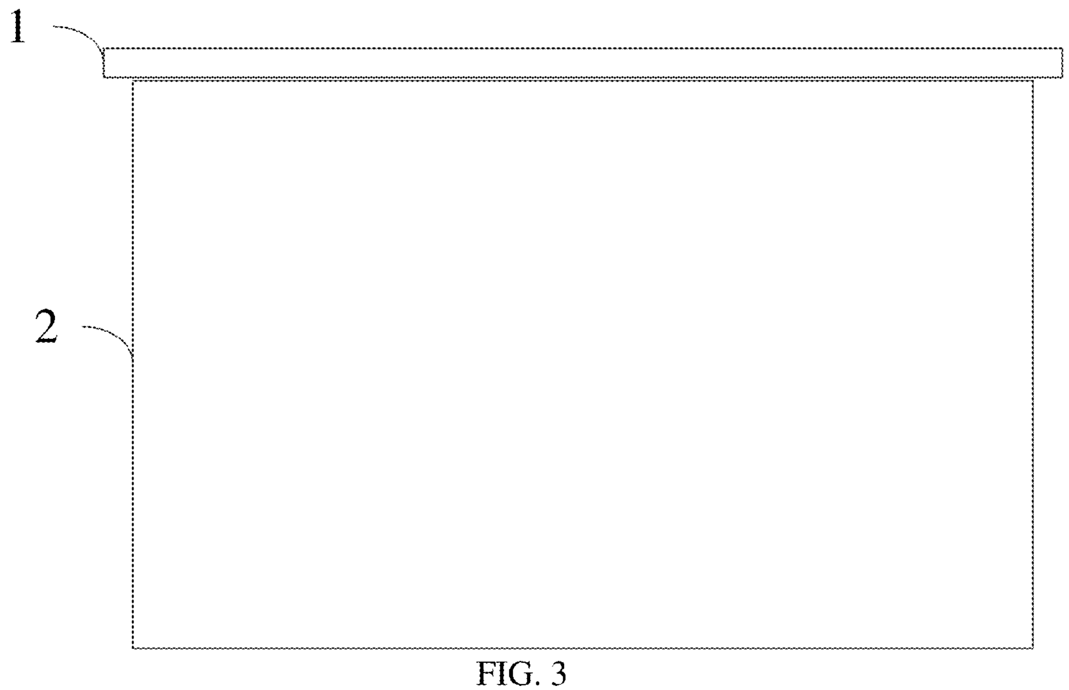
FIG. 3 is a schematic diagram of an installation position of a lamp strip.
Figure 4:
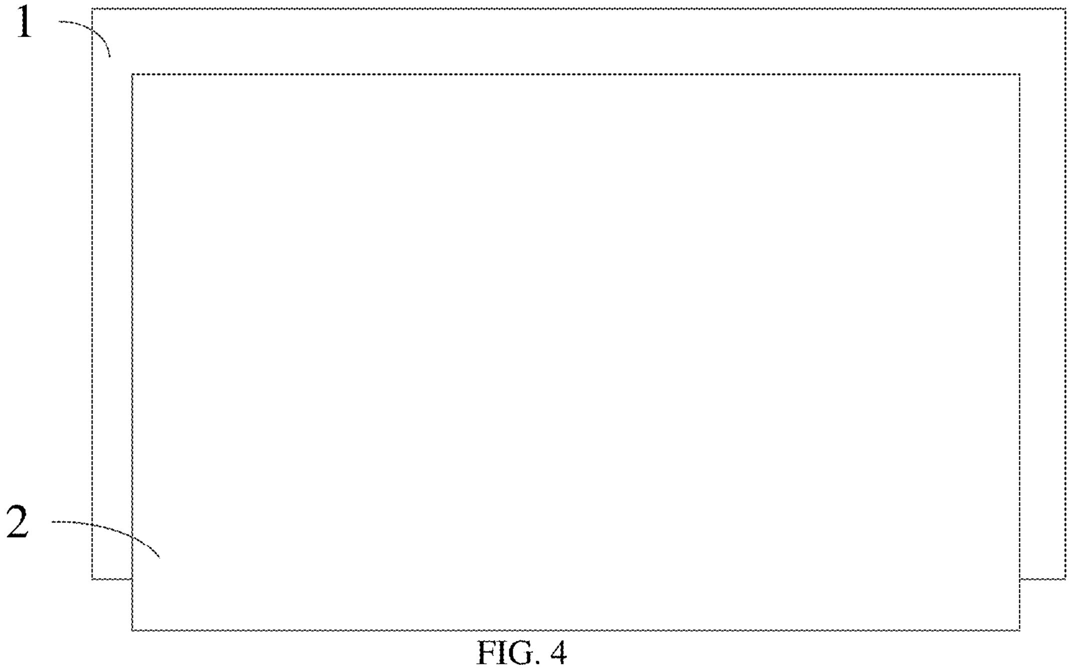
FIG. 4 is another schematic diagram of the installation position of the lamp strip.

Referring to FIG. 3 to FIG. 4, FIG. 3 is a schematic diagram of the installation position of the lamp strip, and FIG. 4 is another schematic view of the installation position of the lamp strip. In FIG. 3, the lamp strip 1 is provided above the electronic device 2. The lamp strip 1 is in a straight shape, and corresponds to one sub-lamp strip. In FIG. 4, the lamp strip 1 is provided around the electronic device 2, showing an inverted U shape, which corresponds to three sub-lamp strips. In other embodiments, the user can also set other positional relationships based on needs, which is not limited in the present application. The straight shape and the inverted U shape are just examples of the present application. For example, the lamp strip surrounds four sides of the electronic device, etc.

In some embodiments, the lamp strip can be in direct contact with the electronic device, or the lamp strip can be provided on a support structure near the television. Usually, the lamp strip has multiple lamp beads and a microprocessor (MCU) for controlling the multiple lamp beads. The multiple lamp beads are controlled by the microprocessor, and the lamp beads can be LED lamp beads.

The lamp strip can have a Bluetooth module, which is used to connect with the Bluetooth module of the electronic device through the Bluetooth module, thereby realizing communication between the lamp strip and the electronic device.

When the installation of the lamp strip is completed and the lamp strip is connected to the electronic device, the program for controlling the lamp strip of the electronic device can output a setting interface, and the user can complete the settings of the lamp strip on this interface. The actual shape of the lamp strip (such as the above-mentioned straight shape and inverted U-shape) is entered into the program for controlling the lamp strip. For example, if the lamp strip is placed in a straight shape, the shape of the lamp strip is selected to be a straight shape, and for example, if the lamp strip is placed in the inverted U shape, the shape of the lamp strip is selected to be an inverted U shape and the number of lamp beads on each side is determined.

In some embodiments, a length of the lamp strip may be large. After the user sets up the lamp strip, available or unavailable lamp beads for the lamp strip can be set and input into the program for controlling the lamp strip. Available lamp beads are lamp beads that need to be controlled, and unavailable lamp beads are lamp beads that do not need to be controlled. The unavailable lamp beads may be due to the fact that the lamp strip is too long, causing the lamp beads that do not need to be controlled to be hidden in some areas.

The multiple lamp beads in step S11 refer to available lamp beads, excluding unavailable lamp beads in the above situation.

Step S12, determining light drive data corresponding to a plurality of the lamp beads according to the target program information, the target light control strategy, the shape of the lamp strip, and the lamp beads corresponding to each of the sub-lamp strip.

Step S13, sending a plurality of the light drive data to the lamp strip, so that the lamp strip performs display control on a plurality of the lamp beads according to the plurality of the light drive data.

It is necessary to determine initial drive data corresponding to the lamp strip based on the target program information, the initial drive data can include the initial drive data of each of multiple lamp beads; then adaptively adjust the initial drive data of each lamp bead based on the shape of the lamp strip and the lamp beads corresponding to each of the sub-lamp strips; and obtain the light drive data of each lamp bead.

It should be noted that the initial drive data corresponding to different target program information is different, so that the plurality of light drive data corresponding to the plurality of lamp beads is different. For the same initial drive data corresponding to the same program information, if the shapes of the lamp strips are different, the plurality of light drive data corresponding to the lamp beads is also different. For the same initial drive data corresponding to the same program information, if the shapes of the lamp strips are the same, when the number of the lamp beads corresponding to the sub-lamp strips is different, the plurality of light drive data corresponding to the lamp beads is also different.

Multiple lamp beads (available lamp beads) in the lamp strip all have corresponding lamp bead numbers. The electronic device obtains multiple light drive data corresponding to the multiple lamp beads based on the initial drive data, the shape of the lamp strip and the lamp beads corresponding to the sub-lamp strip. The multiple light drive data correspond to the respective lamp bead numbers of multiple lamp beads. After the lamp strip obtains multiple light drive data, the light drive data of each lamp bead is determined from the multiple light drive data according to the lamp bead number to perform display control on the multiple lamp beads.

The technical solution of the present application proposes a method for controlling the lamp strip, which is used for the electronic device. The electronic device is connected to the lamp strip. The lamp strip includes several sub-lamp strips, and each of the sub-lamp strips corresponds to several lamp beads. The method includes the following steps: obtaining the target program information to be played by the electronic device and the target light control strategy corresponding to the target program information; determining the light drive data corresponding to several lamp beads according to the target program information, the target light control strategy, the shape of the lamp strip and the lamp beads corresponding to each sub-lamp strip; and sending several light drive data to the lamp strip, so that the lamp strip can display and control several lamp beads based on several light drive data.

Using the method of the present application, the electronic device automatically obtains the light drive data corresponding to multiple lamp beads in the lamp strip based on the target program information, the shape of the lamp strip, and the lamp beads corresponding to each of the sub-lamp strips, so that the lamp strip uses the light drive data to display and control several lamp beads, thereby realizing interactive control between electronic devices and lamp strips.

Further, before determining the light drive data corresponding to a plurality of the lamp beads according to the target program information, the target light control strategy, the shape of the lamp strip and the lamp beads corresponding to each of the sub-lamp strips, the method further includes: receiving a selection instruction for the shape of the lamp strip; determining the shape of the lamp strip according to the selection instruction for the shape of the lamp strip; receiving a selection instruction for the number of lamp beads; and obtaining the plurality of lamp strips and the number of lamp beads corresponding to each of the sub-lamp strips according to the shape of the lamp strip and the selection instruction for the number of lamp beads.

When the installation of the lamp strip is completed and the lamp strip is connected to the electronic device, the program for controlling the lamp strip of the electronic device can output a setting interface, and the user can complete the settings of the lamp strip on this interface. The shape selection instruction is received and the actual shape of the lamp strip (such as the above-mentioned lamp strips in a straight shape or an inverted U shape) is entered into the program for controlling the lamp strip. For example, if the lamp strip is placed in the straight shape, it is necessary to select the shape of the lamp strip to the straight shape. For example, if the lamp strip is placed in the inverted U shape, it is necessary to select the shape of the lamp strip to the inverted U shape.

For different shapes of the lamp strips, the corresponding number of the sub-lamp strips is different. The shape of the lamp strip is set according to the shape selection instruction, and the number selection instruction of the lamp bead continues to be sent to each sub-lamp strip to determine the number of lamp beads for each sub-lamp strip.

For example, if the shape of the lamp strip is determined to be the straight shape, only one quantity selection instruction of the lamp bead needs to be sent for the straight-shape lamp strip to determine the number of lamp beads in the straight-shape lamp strip. If the shape of the lamp strip has two or more sides (for example, an inverted U-shape has three sides, each side is the sub-lamp strip), it is necessary to determine the length of each side according to the shape selection instruction of lamp strips, and determine the number of lamp beads used to display on each side according to the selection instruction for the number of lamp beads on each side, that is, one side corresponds to one sub-lamp strip, and one sub-lamp strip corresponds to one number selection instruction for the lamp bead.

Further, before obtaining the target program information played by the electronic device and the target light control strategy corresponding to the target program information, the method further includes: determining application scene information of the target program information; determining a target light control strategy corresponding to the application scene information according to a light control strategy set, and the light control strategy set includes light control strategies corresponding to different application scene information.

In the present application, application scene information includes sound scenes, image scenes, and ambient light scenes. In the ambient light scene, changes in the program information of the electronic device will not affect changes in the light drive data of the lamp bead. The light drive data of the lamp bead has a fixed ambient light strategy, which can be obtained based on the user's settings. In the sound scene, the target program information of the electronic device can include music information or other sound information. In the image scene, the target program information of the electronic device can include image information (especially video frame information in video information). The electronic device automatically determines the application scene information based on the target program information. In some embodiments, the user can also manually select the application scene information, and the electronic device directly determines the target light control strategy corresponding to the application scene information according to the light control strategy set.

Usually, for an application interface without sound (although it is also image information, it is not the image information in the video), the light control strategy may be determined as the ambient light control strategy corresponding to the ambient light scene (the fixed ambient light strategy described above).

Then, the electronic device determines the corresponding light control strategy—the target light control strategy—in the light control strategy set based on the application scene information. The light control strategy set usually includes a sound control strategy, an image control strategy, and an ambient light control strategy. Based on the application scene information (one of the ambient light scenes, sound scenes, and image scenes), the corresponding target light control strategy is determined.

Then, according to the target program information, the target light control strategy, the shape of the lamp strip, and the lamp beads corresponding to each of the sub-lamp strip, a plurality of light drive data corresponding to the lamp beads is determined.

Further, the target program information includes sound information. Determining the plurality of light drive data corresponding to the lamp beads according to the target program information, the target light control strategy, the shape of the lamp strip and the lamp beads corresponding to each of the sub-lamp strip includes: slicing the sound information to obtain multiple sound clips; inputting the sound clips into a sound-light association model to obtain light change data corresponding to the sound clips; obtaining sound and light data according to the light change data; and obtaining the plurality of light drive data corresponding to the lamp beads according to the sound and light data, the shape of the lamp strip and the lamp beads corresponding to each of the sub-lamp strips.

The sound control strategy refers to the strategy which uses the sound information to obtain multiple light drive data as described above. The sound-light association model can be any form of model, such as a neural network model.

The trained sound information and the trained light change data corresponding to the trained sound information are obtained, and the trained sound information and the trained light change data are used to train the initial model to obtain the sound-light association model.

For each sound clip corresponding to a light change data, a playback duration value corresponding to a sound clip should not be too large to avoid the sound clip input to the sound-light association model being too large, resulting in slow analysis speed and low analysis accuracy of the obtained light change data.

Each sound clip of the sound and light data corresponds to a sound playback duration, and the corresponding light change data is the change in the corresponding light color (including the colors of each of three units RGB) during the sound playback duration. The light change data of each sound clip is connected according to the connection method of multiple sound clips to obtain the sound and light data.

For each lamp bead, it can correspond to one sound and light data, and multiple lamp beads correspond to their own sound and light data.

Then, according to the shape of the lamp strip and the number of lamp beads, the sound and light data of each lamp bead are appropriately adjusted, thereby obtaining the adjusted sound and light data—light drive data.

For example, for the inverted U-shaped lamp strip, the lamp beads on both sides increase the value of the light drive data (specific RGB value), etc., and the lamp beads on the top are not adjusted; while for the straight-shaped lamp strip, the entire lamp strip is not adjusted.

When the sound and light data are the same, but the number of lamp beads is different, the light drive data may be different. For another example, for the inverted U-shaped lamp strip, when the number of lamp beads on both sides is less than the first preset number, the value of the light drive data (specific RGB value) of the lamp beads on both sides is increased. When the number of lamp beads on both sides is not less than the first preset number, the lamp beads on both sides will not be adjusted.

It can be understood that the above examples are only exemplary descriptions. The user can set a specific first preset number and a second preset number based on the needs, or determine the changing relationship between the number of lamp beads and the light drive data based on the needs, which is not limited in the present application.

In some embodiments, the electronic device creates a recording thread and instantiates an AudioRecord to continuously record sound information from the sound path inside the electronic device chip. When recording, it is a universal interface, so the sound information is sampled at 48 KHz. Considering that the sound effect of the Bluetooth lamp strip does not require such high-precision sound data, and taking into account the Bluetooth bandwidth issue, the sound information sampled at 48 KHz needs to be re-sampled at 8 KHz. The resampled data is saved in a ring buffer (note that this ring buffer is used to store audio data sampled at 8 KHz in a loop. Assume that the buffer size is N bytes. It starts to store from 0 to N bytes. After it is full, the loop starts to store from 0).

The electronic device creates another thread. This thread is the thread for sending sound information. It periodically takes out the sound information from the ring buffer and encapsulates it according to the protocol requirements. Then it sends the data to the lamp strip through the Bluetooth interface, and the lamp strip itself performs the display control based on the sound information.

In the above two threads, the ring buffer is a public resource, so thread locks must be added when reading and writing data to ensure data security. At the same time, during the reading and writing actions of the ring buffer, the variable of the number of bytes of the saved sound information must be maintained. When writing data, the number of bytes of the saved sound information is increased correspondingly, and after reading, the number of bytes of the saved sound information is correspondingly reduced.

Further, the target program information includes image information; and determining the plurality of light drive data corresponding to the lamp beads based on the target program information, the target light control strategy, the shape of the lamp strip and the lamp beads corresponding to each of the sub-lamp strips includes: performing a screenshot operation on the display interface corresponding to the image information according to the target light control strategy corresponding to the image information, and obtaining screenshot image information; determining an analysis area in the screenshot image information according to the shape of the lamp strip and lamp beads corresponding to each of the sub-lamp strips; and obtaining the light drive data corresponding to the lamp beads according to the pixel values of the analysis area.

Obtaining the light drive data corresponding to the lamp beads according to the pixel values of the analysis area specifically includes: dividing the analysis area into several sub-areas; obtaining an average value of all pixel values in the sub-areas; and using the average value as the light drive data of the lamp beads corresponding to the sub-area.

In an embodiment, when the lamp strip is in the straight shape (including a sub-lamp strip), the content with height of 200 pixels at the top of the screen is converted into RGB data for the lamp strip:

The screenshot image information is the screenshot obtained by taking a screenshot of the playback interface of the target program information. In this example, it can be a first picture of a preset size (for example, the picture pic1 of 1920×1080). The first picture is ARGB (A is the alpha value, RGB is the RGB color of this pixel) format, the alpha value can be ignored during processing, the RGB value is directly processed, all the pixels with a height of 200 pixels high on the upper edge of pic1 are taken out, and the picture pic2 with a resolution of 1920×200, i.e., middle image, is obtained.

According to the number of lamp beads num1, pic2 is horizontally divided into num1 sub-areas. The width of each sub-area is 1920/num1 and the height is 200. The R/C/B values of all pixels in each sub-area are accumulated to obtain sum1. The accumulated sum sum1 is divided by the total pixels in the sub-area (1920*200/num1) to obtain the R/G/B average value avgN of this sub-area (N is 1 to num1), and the R/G/B average value of a sub-area is the light drive data of the lamp bead corresponding to the sub-area.

When the lamp strip is in the inverted U shape (including three sub-lamp strips, a left section, a top section and a right section), to convert the content of a width of 200 pixels on the left, a height of 200 pixels on the top and a width of 200 pixels on the right of the screen into RGB data for the lamp strip, the steps are as follows:

the screenshot image information is the screenshot obtained by taking a screenshot of the playback interface of the target program information. In this example, it can be a second picture of a preset size (for example, a picture pic3 of 1920×1080). The second picture is ARGB (A is the alpha value, RGB is the RGB color of this pixel) format, the alpha value can be ignored during processing and the RGB value is directly processed.

Rotating pic3 clockwise 90 degrees to obtain pic4, taking out content of the height of 200 pixel on the upper edge of pic4 to obtain picture pic5 with a resolution of 1080×200—the middle image; according to the number of lamp beads numLeft on the left in the "inverted U-shaped" mode, dividing pic5 horizontally into numLeft sub-areas, the width of each sub-area is 1080/numLeft, and the height is 200.

Taking out the content of the height of 200 pixel on the upper edge of pic3 to obtain the picture pic6 with a resolution of 1920×200—the middle image; according to the number numTop of lamp beads in the straight-shape mode, dividing pic6 horizontally into numTop sub-areas, the width of each sub-area is 1920/numTop, and the height is 200.

Rotating pic3 counterclockwise 90 degrees to obtain pic7, taking out the content of the height of 200 pixel on the upper edge of pic7 to obtain picture pic8 with a resolution of 1080×200—the middle image; according to the number numRight of lamp beads on the right in the inverted U-shaped mode, dividing pic8 horizontally into numRight sub-area, the width of each sub-area is 1080/numRight, and the height is 200.

The RI/G/B values of all pixels in each sub-area divided in the above steps are accumulate to obtain sum. The accumulated sun sum is divided by the total number of pixels in the sub-area. After calculation, the R/G/B average value avgN of this sub-area is obtained. The R/G/B average value of the sub-area is the light drive data of the lamp beads corresponding to the sub-area.

The total pixels of the left edge image sub-area are 1080*200/numLeft, the total pixels of the top edge image sub-area are 1020*200/numTop, and the total pixels of the right edge image sub-area are 1080*200/numRight.

Based on the above description, it can be seen that each sub-lamp strip may correspond to multiple sub-areas, and the light drive data of several lamp beads corresponding to each sub-area are the same. Usually, each lamp bead corresponds to one sub-area.

Further, before performing a screenshot operation on the display interface corresponding to the image information according to the target light control strategy corresponding to the image information to obtain the screenshot image information, the method further includes: determining maximum color proportion of the image information; when the maximum color proportion does not exceed a preset threshold, performing the screenshot operation on the display interface corresponding to the image information according to the target light control strategy corresponding to the image information to obtain the screenshot image information.

Determining the maximum color proportion of the image information includes: obtaining histogram data corresponding to the image information; obtaining color data according to the histogram data; and obtaining the maximum color proportion according to the color data.

In this embodiment, the image information particularly refers to the video frame information corresponding to the video, that is, in this embodiment, the output of the electronic device is video. The histogram data is obtained from a driver of the electronic device—HSI histogram (H hue histogram, S saturation histogram and I brightness histogram).

The definition of HSI is as follows. Hue (H), which is related to the frequency of light waves, represents the human senses' feelings of different colors, such as red, green, blue, etc, or represents a certain range of colors, such as warm and cold colors. Saturation (S) indicates the purity of color. Pure spectral colors are completely saturated. Adding white light will dilute the saturation. The greater the saturation, the more vivid the color will look, and vice versa. Intensity (I), which corresponds to imaging brightness and image grayscale, is the brightness of the color.

A chip of the electronic device can directly provide HSI histogram information. In the HSI histogram obtained from the chip driver, the hue histogram is a 32-order array (different chips may have different hue orders). Different colors will be reflected in different orders on the hue histogram. For example, for a pure red (255,0,0) picture, data on the hueHist array of the hue histogram is 255,0,0,0, 0,0,0,0, 0,0,0,0, 0,0,0,0, 0,0,0,0, 0,0,0,0, 0,0,0,0, 0,0,0,0. In the hueHist array, hueHist[0] is the maximum value 255, and all others are 0, which means that the hue of the color with the largest proportion of the current picture is at the 0th level. In the 32-order hue histogram, the color disk (360°) taken from a certain brightness plane in the HSI color diagram is evenly divided into 32 angles, and the 0th order represents from 0° to 11.25°.

In the HSI color space diagram, 0° is red, 60° is yellow, 120° is green, 180° is cyan, 240° is blue, and 300° is magenta. The color in the middle of the two angles is a transition color, for example, from 0° to 60°, it slowly changes from red to yellow. Therefore, hueHist[0] has the largest value, which means that the color with the largest proportion in the current screen is red.

The histogram of saturation (S) is also a 32-order array (different chips may have different orders). The saturation of different colors will be reflected in different orders on the saturation histogram. For example, for a pure red (255,0,0) picture, data on the saturation histogram satHist array is 0,0,0,0, 0,0,0,0, 0,0,0,0, 0,0,0,0, 0,0,0,0, 0,0,0,0, 0,0,0,0, 0,0,0,255. In the satHist array, satHist[31] is the maximum value 255, and all others are 0, which means that the saturation components of the colors with the largest proportion in the current picture are all at the 31st order. In the 32-order saturation histogram, the saturation from 0% to 100% is evenly divided into 32 levels. The 0th order represents the saturation component from 0 to 3.125%. Whichever level has the largest value means that the saturation of the color that accounts for the most in the picture is at this level Therefore, satHist[31] is the maximum value of 255, which means that the color saturation of the current picture is between 96.876% and 100%.

The histogram of brightness (I) is also a 32-order array (different chips may have different orders). Different brightness will be reflected in different orders on the brightness histogram. For example, for a pure red (255,0,0) picture, data on the brightness histogram intHist array is 0,0,0,0, 0,0,0,0, 0,0,0,0, 0,0,0,255, 0,0,0,0, 0,0,0,0, 0,0,0,0, 0,0,0,0. In the intHist array, intHist[6] is the maximum value of 255, and all others are 0, which means that the brightness component of the color that accounts for the largest proportion in the current picture is at the 6th order. In the 32-order brightness histogram, the brightness from 0% to 100% is evenly divided into 32 levels. The 0th order represents the brightness component from 0 to 3.125%. Whichever order has the largest value means that the brightness of the color that accounts for the most of the picture is at this level. Therefore, intHist[15] is the maximum value of 255, which means that the brightness of the color that accounts for the most part of the current picture is between 46.875 and 50%.

Specifically, the following steps are used to obtain color data (color data includes red data R, blue data B and green data G).

For the hue histogram, first calculating the sum of the data in the hue histogram hueSum, then finding the maximum value hueMax in the hue histogram and the corresponding serial number hueIndex in the hue histogram array, and calculating the proportion of hueMax in hueSum (hueMax/hueSum) to determine whether the calculation result is greater than the determination threshold value (for example, 60%). If it is greater than the threshold value, it is necessary to calculate the target chromaticity value (hue angle) corresponding to hueMax. The method is: HI=360°/32*hueIndex.

For the saturation histogram, also calculating the sum satSum of the data in the saturation histogram, then finding the maximum value satMax in the saturation histogram and the corresponding serial number satIndex in the saturation histogram array, and calculating the proportion of satMax in satSum (satMax/satSum) to determine whether the calculation result is greater than the determination threshold value (for example, 60%). If it is greater than the threshold value, it is necessary to calculate the target saturation value corresponding to satMax. The method is: S1=1.0/32*satIndex.

For the brightness histogram data, also calculating the sum intSum of the data in the brightness histogram, then finding the maximum value intMax in the brightness histogram and the corresponding serial number intIndex in the brightness histogram array, and calculating the proportion of intMax in intSum (intMax/intSum) to determine whether the calculation result is greater than the determination threshold value (for example, 60%). If it is greater than the threshold value, it is necessary to calculate the target brightness value corresponding to intMax. The method is: S1=1.0/32*intIndex.

The preset database includes multiple hue intervals, each hue interval corresponds to one calculation strategy. In the present application, the multiple hue intervals include: [0°, 120°), [120°, 2400°) and [240°, 360°), the corresponding calculation strategy is as follows.

For the hue interval [0°, 120°) the calculation strategy refers to Formula 1, which is as follows:

$$b = \frac{1}{3}(1 - S1)$$

$$r = \frac{1}{3}\left[1 + \frac{S1\cos H1}{\cos(60° - H1)}\right]$$

$$g = 1 - r - b$$

Where r is the red data in the color data, g is the green data in the color data, and b is the blue data in the color data.

For the hue interval [120°, 240°), the calculation strategy refers to Formula 2, which is as follows:

$$H2 = H1 - 120°$$

$$b = \frac{1}{3}(1 - S1)$$

$$r = \frac{1}{3}\left[1 + \frac{S1\cos H2}{\cos(60° - H2)}\right]$$

$$g = 1 - r - b$$

For the hue interval [240°, 360°), the calculation strategy refers to Formula 3, which is as follows:

$$H3 = H1 - 240°$$

$$b = \frac{1}{3}(1 - S1)$$

$$r = \frac{1}{3}\left[1 + \frac{S1\cos H3}{\cos(60° - H3)}\right]$$

$$g = 1 - r - b$$

The interval including the target hue value among the above three hue intervals is determined to be the selected hue interval, and its corresponding calculation strategy is the selected calculation strategy (one of the three formulas).

The color data obtained in the above way is a floating point number normalized to the range of 0 to 1. It is necessary to multiply r, g and b by 255 to obtain the corresponding color data. The color data after multiplying by 255 is used to obtain the multiple light drive data corresponding to the lamp beads, that is, the color data described below refers to the color data obtained after multiplying the r, g and b data obtained by the above three formulas by 255.

The color data includes the color data corresponding to each pixel in the image information. Therefore, for the target image, each pixel will correspond to one color data (including the red data, blue data and green data of the pixel). The number of pixels of the same color among pixels with the same color data is counted, the color data with the largest number of pixels of the same color is determined as the maximum color, and the ratio of the pixel of the maximum color to all pixels of the image information is determined as the maximum color proportion.

When the maximum color proportion exceeds a preset threshold (such as 60%, set by the user based on needs), the color data corresponding to the maximum color proportion is used as the light drive data corresponding to a plurality of lamp beads. Then, by using the shape of the lamp strip and the number of lamp beads in each of the sub-lamp strips, the color of each lamp bead is adjusted based on the maximum color to obtain the adjusted maximum color corresponding to each lamp bead, and the adjusted maximum color of each lamp bead (in the form of color data) is the light drive data of the lamp bead.

When the maximum color proportion exceeds the preset threshold, the corresponding light drive data is obtained in the above manner.

In the present application, different light control strategies are provided for different application scene information. At the same time, the electronic device can use different light control strategies to obtain the light drive data that better matches the target program information of the electronic device, so that display effect of the lamp beads of the lamp strip better matches the target program information of the electronic device, which improves the interaction effect between the lamp strip and the electronic device, and improves the user experience.

At the same time, for image information, the present application proposes the above two methods of obtaining light drive data (the maximum color proportion is greater than the preset threshold and less than the preset threshold), which can make the light drive data of the lamp bead more consistent with the image information, and further improve user experience.

Figure 5:
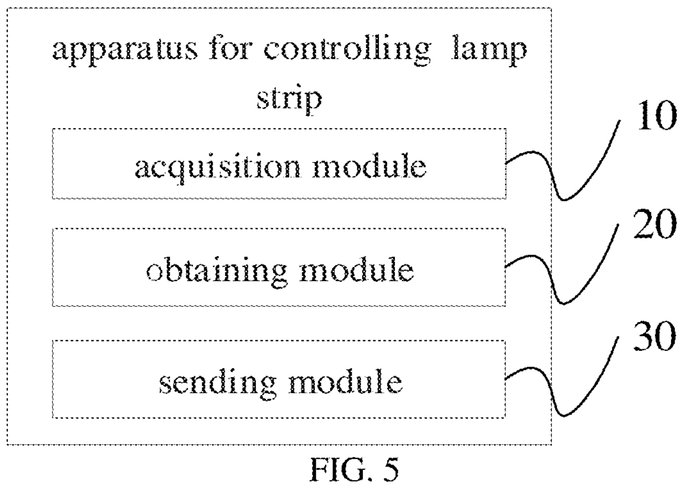
FIG. 5 is a structural block diagram of apparatus for controlling a lamp strip according to the present application.

Referring to FIG. 5, FIG. 5 is a structural block diagram of a lamp strip control apparatus according to the present application. The apparatus is used for a display device. The display device is connected to the lamp strip. The lamp strip includes a plurality of lamp beads; based on the same inventive concept as the previous embodiment, the apparatus includes an acquisition module 10, an obtaining module 20 and a sending module 30.

The acquisition module 10 is configured to acquire the target program information played by the display device and the target light control strategy corresponding to the target program information.

The obtaining module 20 is configured to determine light drive data corresponding to a plurality of lamp beads according to the target program information, the target light control strategy, the shape of the lamp strip, and the lamp beads corresponding to each of the sub-lamp strips.

The sending module 30 is configured to send a plurality of the light drive data to the lamp strip, so that the lamp strip performs display control on a plurality of the lamp beads according to the plurality of the light drive data.

Further, the target program information includes image information. The obtaining module 20 is specifically configured to perform a screenshot operation on the display interface corresponding to the image information according to the target light control strategy corresponding to the image information, and obtain the screenshot image information. According to the shape of the lamp strip and the lamp beads corresponding to each of the sub-lamp strips, an analysis area is determined in the screenshot image information. According to the pixel value of the analysis area, the light drive data corresponding to the lamp bead is obtained.

Further, the obtaining module 20 is specifically configured to divide the analysis area into several sub-areas; obtain the average value of all pixel values in the sub-area; and use the average value as the light drive data of the lamp bead corresponding to the sub-area.

Further, the obtaining module 20 is also configured to determine the maximum color proportion of the image information; when the maximum color proportion does not exceed a preset threshold, perform a screenshot operation on the display interface corresponding to the image information according to the target light control strategy corresponding to the image information, and obtain the screenshot image information.

Further, the obtaining module 20 is also configured to obtain the histogram data corresponding to the image information; obtain color data according to the histogram data; and obtain the maximum color proportion according to the color data.

Furthermore, the apparatus also includes a drive data obtaining module.

The drive data obtaining module is configured to use the color data corresponding to the maximum color proportion as light drive data corresponding to a plurality of lamp beads when the maximum color proportion exceeds the preset threshold.

Further, the target program information includes sound information. The obtaining module 20 is specifically configured to slice the sound information to obtain multiple sound clips; input the sound clips into the sound and light association model to obtain light change data corresponding to the sound clips; obtain the sound and light data according to the light change data; and obtain light drive data corresponding to a plurality of lamp beads according to the sound and light data, the shape of the lamp strip and the lamp beads corresponding to each of the sub-lamp strips.

Furthermore, the apparatus also includes a strategy determination module.

The strategy determination module is configured to determine application scene information of the target program information; determine a target light control strategy corresponding to the application scene information according to the light control strategy set, where the light control strategy set includes the light control strategies corresponding to different application scene information.

Furthermore, the apparatus also includes a lamp strip selection module.

The lamp strip selection module is configured to receive a shape selection instruction for the lamp strip; determine the shape of the lamp strip according to the shape selection instruction for the lamp strip; receive a number selection instruction for the lamp bead; and obtain the plurality of sub-lamp strips and the number of lamp beads corresponding to each of the sub-lamp strip according to the shape of the lamp strip and the number selection instruction for the lamp bead.

It should be noted that since the steps performed by the apparatus of this embodiment are the same as those of the foregoing method embodiment, reference can be made to the foregoing embodiment for its specific implementation manner and the technical effects that can be achieved, and will not be described again here.

Utilizing the method of the present application, the display device automatically obtains light drive data corresponding to multiple lamp beads in the lamp strip according to the target program information, the shape of the lamp strip, and the lamp beads corresponding to each of the sub-lamp strips, so that the lamp strip uses the light drive data to perform display control on several lamp beads, thereby realizing interactive control between the display device and the lamp strip.

In addition, in the present application different light control strategies are provided for different application scene information. At the same time, the display device can use different light control strategies to obtain light drive data that is more consistent with the target program information of the display device, so that the lamp bead display effect of the lamp strip better matches the target program information of the display device, improving the interaction effect between the lamp strip and the display device and improving the user experience.

At the same time, for image information, the present application proposes the above two ways of obtaining light drive data (the maximum color proportion is greater than the preset threshold and less than the preset threshold), which can make the light drive data of the lamp bead more consistent with the image information, and further improve user experience.

Figure 6:
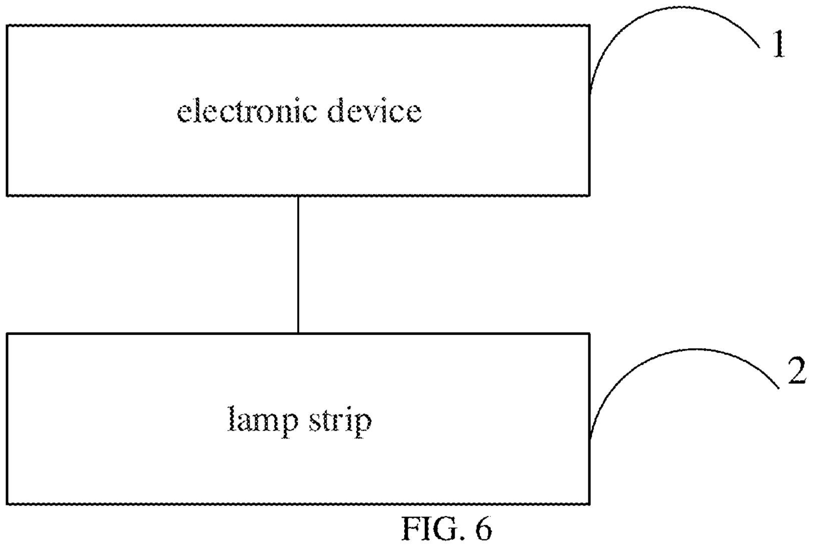
FIG. 6 is a structural block diagram of a light control system according to the present application.

Referring to FIG. 6, FIG. 6 is a structural block diagram of the light control system according to the present application. The system includes an electronic device 1 and a lamp strip 2. The lamp strip 2 includes a plurality of sub-lamp strips, and each of the sub-lamp strips corresponds to a plurality of lamp beads. The electronic device 1 stores a program for controlling the lamp strip. When the program for controlling the lamp strip is executed by the electronic device, the steps of the method for controlling the lamp strip described above are implemented.

In addition, the present application also proposes an electronic device. The electronic device includes: a memory, a processor, and a program for controlling the lamp strip stored on the memory and executed on the processor. When the program for controlling the lamp strip is executed by the processor, the steps of the method for controlling the lamp strip as described above are implemented.

In addition, the present application also proposes a computer-readable storage medium. A program for controlling the lamp strip is stored on the computer-readable storage medium. When the program for controlling the lamp strip is executed by a processor, the steps of the method for controlling the lamp strip as described above are implemented.

It should be noted that since the steps performed by the system of this embodiment are the same as those of the foregoing method embodiment, reference can be made to the foregoing embodiment for its specific implementation manner and the technical effects that can be achieved, and will not be described again here.

Figure 7:
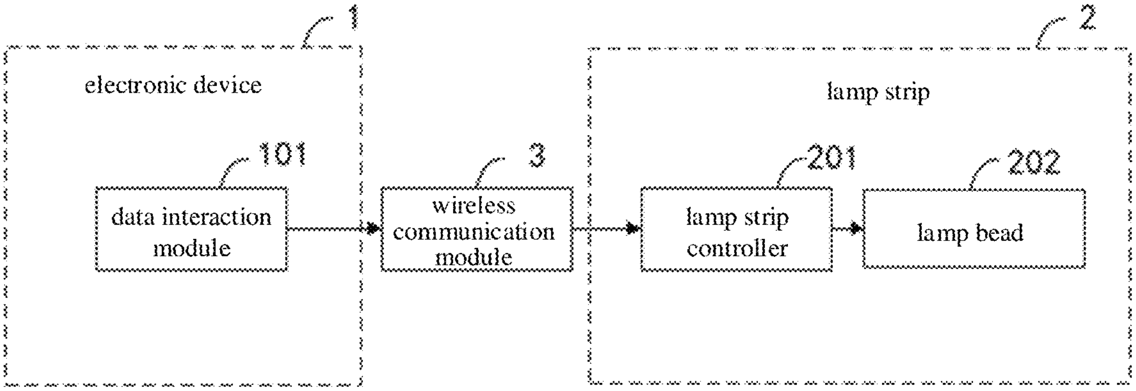
FIG. 7 is a schematic structural diagram of a lamp strip system according to an embodiment of the present application.

Referring to FIG. 7, FIG. 7 is a schematic structural diagram of a lamp strip system according to an embodiment of the present application.

As shown in FIG. 7, the lamp strip system includes an electronic device 1 and a lamp strip 2.

Specifically, the electronic device 1 includes a data interaction module 101, and the lamp strip 2 includes a lamp strip controller 201 and several lamp beads 202. The data interaction module 101 is configured to send lamp strip control information to the lamp strip controller 201. The lamp strip controller 201 is connected to the data interaction module 101 and is configured to receive the lamp strip control information and convert the lamp strip control information into a first lamp strip control information, and send the first lamp strip control information to the lamp beads 202. The lamp beads 202 are connected to the lamp strip controller 201, to receive the first lamp strip control information, and to perform the corresponding display action according to the received first lamp strip control information.

It is easy to understand that existing ambient lights are usually provided independently on the outline, edge, background wall or related decorations of the electronic device 1, and the ambient lights often use fixed display colors and display methods, they have no connection with the electronic device 1, resulting in users not being able to enjoy the best ambient light effect.

In this embodiment, in order to increase the connection between the electronic device 1 and the ambient light, a data interaction module 101 can be provided at the electronic device 1. The data interaction module 101 obtains the lamp strip control information associated with the electronic device 1, and uses the lamp strip control information to control the display action of the lamp beads 202 on the lamp strip 2, so that the lamp beads 202 are displayed according to the electronic device 1, achieving the display effect of the ambient light of the electronic device 1.

After that, the lamp strip controller 201 receives the lamp strip control information and converts the lamp strip control information into the first lamp strip control instruction. When the first lamp strip control instruction is sent to the lamp beads 202, the lamp beads 202 can perform the display action corresponding to the lamp strip control information.

It should be noted that the electronic device 1 can be any electronic device 1 that can interact with the user, such as a television, a stereo, a smart phone, a computer, etc., which is not limited in this embodiment.

In some embodiments, the lamp strip system also includes a wireless communication module 3, which is connected to the data interaction module 101 and the lamp strip controller 201 respectively.

In practical applications, when a corresponding lamp strip 2 is provided for the electronic device 1 and the lamp strip 2 is used to perform corresponding display actions according to the electronic device 1 to achieve an ambient light display effect, the lamp strip 2 can be provided at a position around the housing of the electronic device 1 such as the outline or edge of the electronic device 1. The lamp strip 2 can directly obtain the first lamp strip control instruction through the data interaction module 101 electrically connected to the lamp strip 2.

However, in some cases, the lamp strip 2 is provided at a certain distance from the electronic device 1. For example, the lamp strip 2 is provided on the background wall of the TV in the living room. The lamp strip controller 201 of the lamp strip 2 controls the display of the lamp beads 202 according to the lamp strip control information sent by the data interaction module 101 of the TV. At this time, in order to ensure the beautiful setting of the lamp strip 2, the wireless communication module 3 is used to transmit the lamp strip control information between the lamp strip 2 and the living room TV.

It should be noted that the wireless communication module 3 can be a communication module that can establish wireless transmission between the lamp strip 2 and the data interaction module 101, such as a Bluetooth communication module, an infrared communication module or a WIFI communication module, which is not limited in this embodiment. The wireless communication module 3 can be provided in the lamp strip 2, for example, integrated with the lamp strip controller 201, or can be provided independently of the electronic device 1 and the lamp strip 2, or can be provided in the electronic device 1.

In this embodiment, a lamp strip system is provided. The lamp strip system includes an electronic device 1, a wireless communication module 3, and a lamp strip 2. The electronic device 1 includes a data interaction module 101, and the lamp strip 2 includes a lamp strip controller 201 and several lamp beads 202. The data interaction module 101 is configured to directly send the lamp strip control information to the lamp strip controller 201, or to send the lamp strip control information to the lamp strip controller 201 through the wireless communication module 3. The lamp strip controller 201 generates the first lamp strip control instruction according to the received lamp strip control information to control the lamp beads 202 to perform the corresponding display action. In this embodiment, the lamp strip controller 201 receives the lamp strip control information transmitted through electrical connection or wireless connection, and controls the lamp beads 202 as the ambient light of the electronic device 1 to perform the corresponding display actions, which can improve the interactive connection between the ambient light and the electronic device 1, and enhance the user's listening experience.

Figure 8:
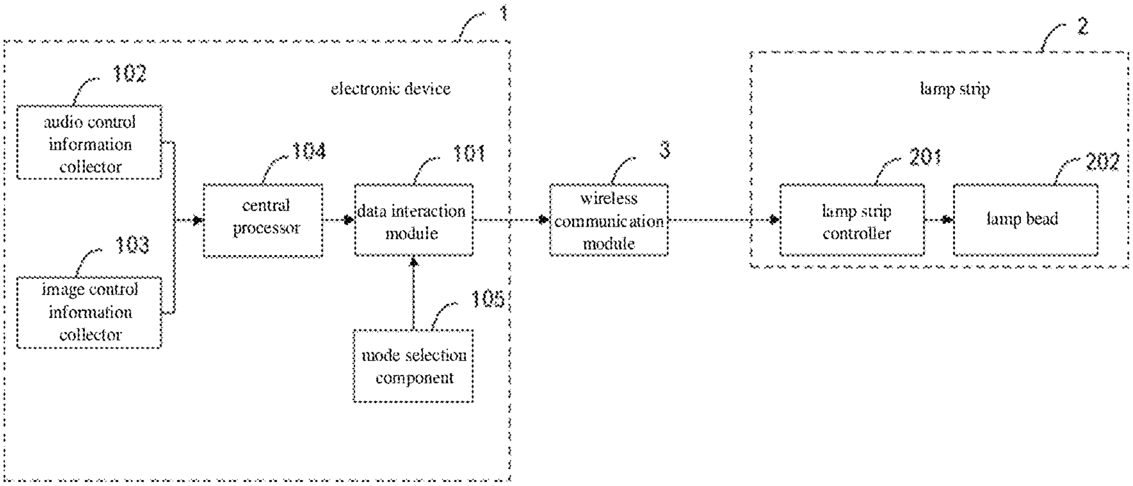
FIG. 8 is a schematic structural diagram of a lamp strip system according to another embodiment of the present application.

Referring to FIG. 8, FIG. 8 is a schematic structural diagram of a lamp strip system according to another embodiment of the present application.

As shown in FIG. 8, the lamp strip system includes an electronic device 1 and a lamp strip 2. The electronic device 1 includes a data interaction module 101, and the lamp strip 2 includes a lamp strip controller 201 and a plurality of lamp beads 202.

In practical applications, the electronic device 1 can usually play audio or video. In order to realize the atmosphere display control of the lamp bead 202 on the electronic device 1, the display actions of the lamp beads 202 can be controlled by collecting the audio or video played by the electronic device 1.

Specifically, the electronic device 1 can also include an audio control information collector 102 and a central processor 104. The audio control information collector 102 is connected to the central processor 104, for collecting audio control information of the electronic device 1. The central processor 104 is connected to the data interaction module 101, for converting audio control information into lamp strip control information and sending it to the data interaction module 101.

In practical applications, the data interaction module 101 can also be integrated into the central processor 104.

It is easy to understand that when the electronic device 1 plays audio, after collecting the audio control information, the audio control information collector 102 can transmit the audio control information to the central processor 104. The central processor 104 converts the audio control information into the lamp strip control information according to preset rules. Specifically, the audio control information can be audio-related information such as audio volume information or frequency information; and the lamp strip control information can be display-related information such as the display interval or display brightness of the lamp beads 202 corresponding to the audio control information.

It should be noted that the audio control information collector 102 can use an audio module with a built-in microphone, such as the E200-470A17S audio collection module, or can use an external microphone and configure a corresponding audio amplifier, such as the ROHM-BH1418FV-E2 audio amplifier module. Of course, the audio control information collector 102 can also be any other collector capable of collecting the audio of the electronic device 1, which is not limited in this embodiment. The audio control information collector 102 can also be integrated into the central processor 104.

Specifically, the electronic device 1 can also include an image control information collector 103 and a central processor 104. The image control information collector 103 is connected to the central processor 104, for collecting image control information of the electronic device 1. The central processor 104 is connected to the data interaction module 101, for converting the image control information into the lamp strip control instruction and sending it to the data interaction module 101.

It is easy to understand that when the electronic device 1 plays an image, after collecting the image control information, the image control information collector 103 can transmit the image control information to the central processor 104, and the central processor 104 converts the image control information into the lamp strip control information according to the preset rules. Specifically, the image control information can be image brightness information or image color information, and the lamp strip control information can be display-related information such as the display interval or display brightness of the lamp beads 202 corresponding to the image control information.

It should be noted that the image control information collector 103 can use a high-performance image acquisition module, such as VS-MC1208VD1, or a low-power color acquisition module, such as the BH1745NUC color sensor. Of course, the image control information collector 103 can also be any other collector that can collect the image of the electronic device 1, which is not limited in this embodiment. The image control information collector 103 can also be integrated into the central processor 104.

In this embodiment, in order to switch the lamp strip control information received by the data interaction module 101 to enable the lamp beads 202 to perform the corresponding display actions according to different playback contents, the electronic device 1 can also include a mode selection component 105. The mode selection component 105 is connected to the central processor 104 and is configured to receive the user's selection action, generate a mode selection instruction according to the selection action, and send the mode selection instruction to the central processor 104. The central processor 104 is also configured to collect the corresponding audio information or image information according to the mode selection instruction.

It is easy to understand that after collecting and receiving the user's selection action, the mode selection component 105 sends the mode selection instruction corresponding to the selection action to the central processor 104. The central processor 104 collects the corresponding playback information according to the mode selection instruction, and then the data interactive module 101 drives the lamp strip controller 201 to control the lamp beads 202 to perform display actions according to the playback information, so that the lamp beads 202 are associated with the content played by the electronic device 1.

It should be noted that the mode selection component 105 collects the user's selection action, and selects the component of the device that collects the playback information according to the user's selection action. The mode selection component 105 can be an interactive device such as a button, a switch, or a touch screen, which is not limited in this embodiment.

In practical applications, the mode selection component 105 can also be provided independently of the electronic device 1.

In this embodiment, a lamp strip system is provided. The lamp strip system includes an electronic device 1, a wireless communication module 3 and a lamp strip 2. The electronic device 1 includes a data interaction module 101, an audio information collector, an image information collector, a mode selection component 105 and central processor 104. The lamp strip 2 includes a lamp strip controller 201 and a plurality of lamp beads 202. This embodiment uses the mode selection component 105 provided in the electronic device 1 to select the corresponding information collector of the electronic device 1, so as to control the lamp beads 202 to perform display actions following information played by the electronic device 1, thereby achieving the effect of the ambient light of the electronic device 1, further improving the experience of using the lamp strip system.

Figure 9:
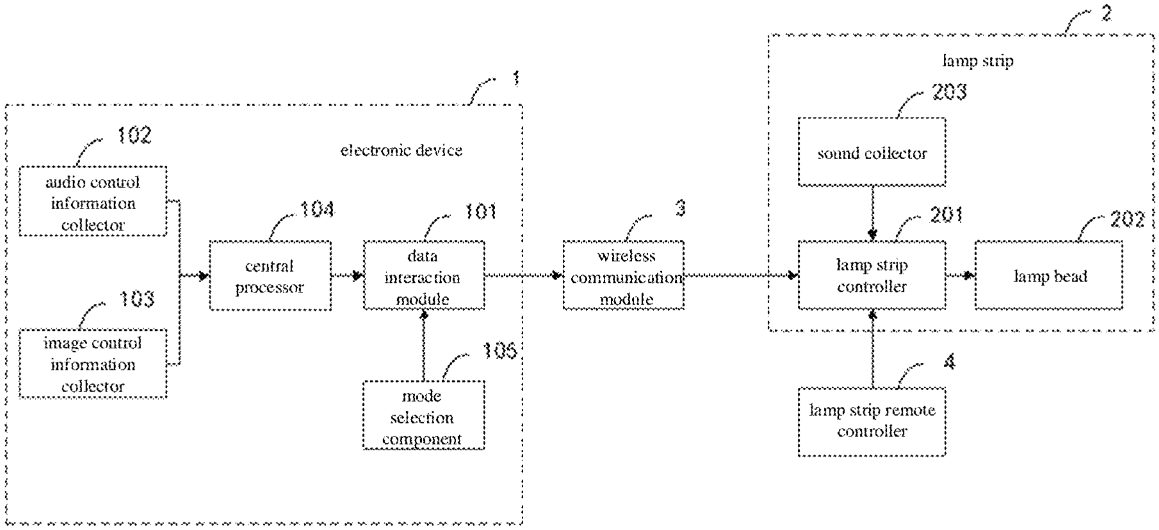
FIG. 9 is a schematic structural diagram of a lamp strip system according to another embodiment of the present application.

Referring to FIG. 9, FIG. 9 is a schematic structural diagram of a lamp strip system according to another embodiment of the present application.

As shown in FIG. 9, the lamp strip system includes an electronic device 1, a wireless communication module 3 and a lamp strip 2. The electronic device 1 includes a data interaction module 101, an audio information collector, an image information collector, a mode selection component 105 and a central processor 104. The lamp strip 2 includes a lamp strip controller 201 and several lamp beads 202.

In practical applications, in order to achieve flexible display control of the lamp bead 202 as an ambient light, the lamp bead 202 can not only perform corresponding display according to the audio or video played by the electronic device 1, but can also preset multiple display rules, and perform the display action corresponding to the display rule according to the user's selection.

Specifically, the lamp strip system also includes a lamp strip remote controller 4. The lamp strip remote controller 4 is connected to the lamp strip controller 201. The lamp strip remote controller 4 is configured to collect the user's remote control actions, generate a second lamp strip control instruction according to the user's remote control actions, and send the second lamp strip control instruction to the lamp strip controller 201.

It is easy to understand that in the specific application of the lamp strip system, the user can not only select the lamp strip controller 201 to control the display of the lamp beads 202 according to the playback content of the electronic device 1, but also select the lamp strip controller 201 to control the display of the lamp beads 202 according to the preset control instructions. In this embodiment, a lamp strip remote controller 4 is provided in the lamp strip system, the user's remote control action is collected through the lamp strip remote controller 4, and the second lamp strip control instruction is directly generated according to the user's remote control action and sent to the lamp strip controller 201, thereby controlling the lamp beads 202 to display according to preset rules.

In another embodiment, in order to realize flexible display control of the lamp bead 202 as an ambient light, the lamp bead 202 can not only perform corresponding display according to the audio or video played by the electronic device 1, but can also preset multiple display rules, and perform display actions corresponding to the display rules according to the user's control voice.

Specifically, the lamp strip 2 also includes a sound collector 203. The sound collector 203 is connected to the lamp strip controller 201. The sound collector 203 is configured to collect sound information, generate a third lamp strip control instruction according to the sound information, and send the third lamp strip control instruction to the lamp strip controller 201.

It is easy to understand that in the specific application of the lamp strip system, the user can not only select the lamp strip controller 201 to control the display of the lamp beads 202 according to the playback content of the electronic device 1, but also select the lamp strip controller 201 to control the display of the lamp beads 202 according to the preset voice instructions. In this embodiment, a sound collector 203 is provided in the lamp strip 2, the user's control voice is collected through the sound collector 203, and the third lamp strip control instruction is directly generated according to the user's control voice and sent to the lamp strip controller 201, thereby controlling the lamp beads 202 to display according to preset rules.

It should be noted that the preset rules can include designated color display, designated shape display, designated position display, brightness gradient display, lamp bead 202 transfer display, etc. This embodiment does not specifically limit the display of the preset rules for the lamp bead 202.

Figure 10:
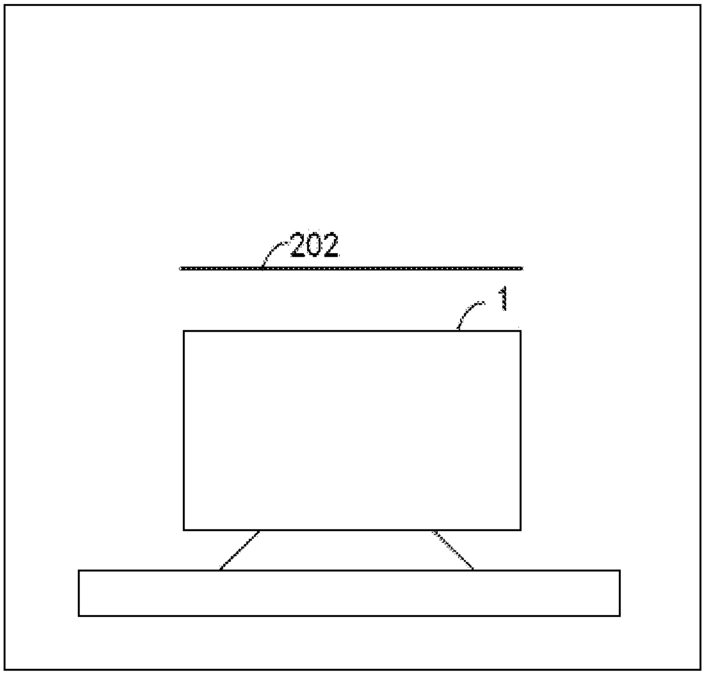
FIG. 10 is a schematic structural diagram of a straight-line arrangement of lamp beads in the lamp strip system according to the present application.
Figure 11:
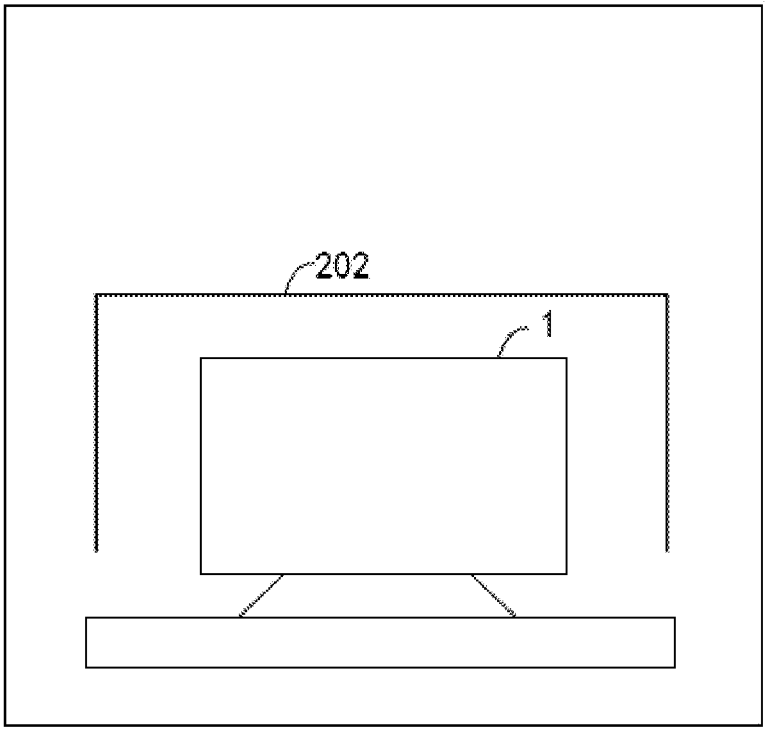
FIG. 11 is a schematic structural diagram of a U-shaped lamp bead arrangement in the lamp strip system according to the present application.

In another embodiment, in order to improve the ambience display effect brought by the lamp beads 202 to the electronic device 1, a plurality of lamp beads 202 can be provided in a straight or U-shape, and provided to surround the periphery or back panel of the electronic device 1. As shown in FIG. 10, when the electronic device is a TV, the lamp beads are arranged in a straight shape on the back panel. As shown in FIG. 11, when the electronic device is a TV, the lamp beads are arranged in a U-shaped on the back panel.

It is easy to understand that when the electronic device 1 plays audio or video, or collects the user's remote control actions, or collects the user's control voice, the electronic device 1 controls the lamp beads 202 of the straight shape or U-shaped arranged around or on the back panel of the electronic device 1 to perform display actions following the use of the electronic device 1, further improving the atmosphere display effect of the lamp strip system.

It should be noted that the arrangement of the lamp beads 202 can include a straight shape, a U-shape, a cross shape, a wavy shape or any shape, which is not limited in this embodiment.

In this embodiment, a lamp strip system is provided. The lamp strip system includes an electronic device 1, a wireless communication module 3, a lamp strip remote control 4 and a lamp strip 2. The electronic device 1 includes a data interaction module 101, an audio information collector, an image information collector, a mode selection component 105 and central processor 104. The lamp strip 2 includes a sound collector 203, a lamp strip controller 201 and a plurality of lamp beads 202. This embodiment can not only control the display of the lamp beads 202 according to the content played by the electronic device 1, but also control the display of the lamp beads 202 according to preset rules, further realizing flexible control of the lamp strip system and enhancing the user's listening experience.

The above are only some embodiments of the present application, and do not limit the scope of the present application. Under the concept of the present application, equivalent structural transformations made by using the contents of the description and drawings of the present application, or directly/indirectly applied in other relevant technical fields, are included in the scope of the present application.

What is claimed is:

1. A method for controlling a lamp strip, applied to an electronic device, the electronic device being connected to the lamp strip, the lamp strip comprising a plurality of sub-lamp strips, and each of the sub-lamp strips corresponding to a plurality of lamp beads; the method comprising:

obtaining target program information played by the electronic device and a target light control strategy corresponding to the target program information;

determining light drive data corresponding to the plurality of lamp beads according to the target program information, the target light control strategy, a shape of the lamp strip and the plurality of lamp beads corresponding to each of the sub-lamp strips; and sending a plurality of the light drive data to the lamp strip, so that the lamp strip performs display control on the plurality of lamp beads according to the plurality of the light drive data, wherein the target program information comprises image information, and determining the light drive data corresponding to the plurality of lamp beads according to the target program information, the target light control strategy, the shape of the lamp strip and the plurality of lamp beads corresponding to each of the sub-lamp strips comprises:

performing a screenshot operation on a display interface corresponding to the image information to obtain screenshot image information according to a target light control strategy corresponding to the image information;

determining an analysis area in the screenshot image information according to the shape of the lamp strip and the plurality of lamp beads corresponding to each of the sub-lamp strip; and obtaining the light drive data corresponding to the lamp beads according to a pixel value of the analysis area, wherein before performing the screenshot operation on the display interface corresponding to the image information according to the target light control strategy corresponding to the image information to obtain the screenshot image information, the method further comprises:

determining maximum color proportion of the image information; and in response to that the maximum color proportion does not exceed a preset threshold, performing the screenshot operation on the display interface corresponding to the image information according to the target light control strategy corresponding to the image information to obtain the screenshot image information.

2. The method of claim 1, wherein obtaining the light drive data corresponding to the plurality of lamp beads according to the pixel value of the analysis area comprises:

dividing the analysis area into a plurality of sub-areas;

obtaining an average value of all pixel values in the sub-areas; and using the average value as the light drive data of the plurality of lamp beads corresponding to the sub-areas.

3. The method of claim 1, wherein determining the maximum color proportion of the image information comprises:

obtaining histogram data corresponding to the image information;

obtaining color data according to the histogram data; and obtaining the maximum color proportion according to the color data.

4. The method of claim 1, wherein after determining the maximum color proportion of the image information, the method further comprises:

in response to that the maximum color proportion exceeds the preset threshold, using color data corresponding to the maximum color proportion as the light drive data corresponding to the plurality of lamp beads.

5. The method of claim 1, wherein the target program information comprises sound information, and determining the light drive data corresponding to the plurality of lamp beads according to the target program information, the target light control strategy, the shape of the lamp strip and the plurality of lamp beads corresponding to each of the sub-lamp strips comprises:

slicing the sound information to obtain multiple sound clips;

inputting the sound clip into a sound and light association model to obtain light change data corresponding to the sound clip;

obtaining sound and light data according to the light change data; and obtaining the light drive data corresponding to the plurality of lamp beads according to the sound and light data, the shape of the lamp strip and the plurality of lamp beads corresponding to each of the sub-lamp strips.

6. The method of claim 1, wherein before obtaining the target program information played by the electronic device and the target light control strategy corresponding to the target program information, the method further comprises:

determining application scene information of the target program information; and determining a target light control strategy corresponding to the application scene information according to a light control strategy set, wherein the light control strategy set comprises light control strategies corresponding to different application scene information.

7. The method of claim 1, wherein before determining the light drive data corresponding to the plurality of lamp beads according to the target program information, the target light control strategy, the shape of the lamp strip and the plurality of lamp beads corresponding to each of the sub-lamp strips, the method further comprises:

receiving a shape selection instruction for the lamp strip;

determining the shape of the lamp strip according to the shape selection instruction for the lamp strip;

receiving a quantity selection instruction for the lamp bead; and obtaining the plurality of sub-lamp strips and the number of the plurality of lamp beads corresponding to each of the sub-lamp strips according to the shape of the lamp strip and the quantity selection instruction for the lamp bead.

8. The method of claim 1, wherein determining light drive data corresponding to the plurality of lamp beads according to the target program information, the target light control strategy, the shape of the lamp strip and the plurality of lamp beads corresponding to each of the sub-lamp strips comprises:

determining initial drive data corresponding to the lamp strip according to the target program information, wherein the initial drive data comprises initial drive data of each of the plurality of lamp beads; and according to the shape of the lamp strip and the plurality of lamp beads corresponding to each of the sub-lamp strips, adjusting the initial drive data of each of the plurality of lamp beads to obtain the light drive data of each of the plurality of lamp beads.

9. An electronic device, comprising:

a memory;

a processor; and a program for controlling a lamp strip stored in the memory and run on the processor, wherein when the program for controlling the lamp strip is controlled by the processor, the method for controlling the lamp strip of claim 1 is implemented.

* * * * *